United States Patent

De Marchi et al.

[11] Patent Number: 6,139,314
[45] Date of Patent: Oct. 31, 2000

[54] ROTARY HEARTH FURNACE

[75] Inventors: Giovanni De Marchi; Stefano Pivot, both of Genoa, Italy

[73] Assignee: Demag Italimpianti S.p.A., Genoa, Italy

[21] Appl. No.: 09/332,885

[22] Filed: Jun. 15, 1999

[30] Foreign Application Priority Data

Jun. 18, 1998 [IT] Italy .................. GE98A0052

[51] Int. Cl.⁷ ........................................ F27B 9/16
[52] U.S. Cl. .................................. 432/138; 414/149
[58] Field of Search ................ 432/124, 138, 432/195; 414/149, 150, 154, 158

[56] References Cited

U.S. PATENT DOCUMENTS

| | | | |
|---|---|---|---|
| 1,999,356 | 4/1935 | Dressler et al. | 414/154 |
| 2,003,450 | 6/1935 | Ladd. | |
| 2,369,529 | 2/1945 | Buckholdt | 432/138 |
| 3,395,904 | 8/1968 | Maeda | 432/138 |
| 3,988,012 | 10/1976 | Jemal | 266/179 |
| 4,452,153 | 6/1984 | Deneau. | |
| 4,578,031 | 3/1986 | Johnson et al. | |
| 4,640,683 | 2/1987 | Mori | 432/134 |
| 5,019,689 | 5/1991 | Bollier et al. | 432/138 |

FOREIGN PATENT DOCUMENTS

| | | |
|---|---|---|
| 1486337 | 6/1967 | France. |
| 912764 | 12/1962 | United Kingdom. |

Primary Examiner—Denise L. Ferensic
Assistant Examiner—Gregory A. Wilson
Attorney, Agent, or Firm—Larson & Taylor

[57] ABSTRACT

Furnace for the treatment of ore on a rotary hearth, including a toroidal chamber, a rotary hearth and drives for the rotary hearth, the hearth being arranged on a supporting frame fitted with guides means and motion-supports; the drives are at least partly connected to the said guides and/or to the motion-supports means.

4 Claims, 3 Drawing Sheets

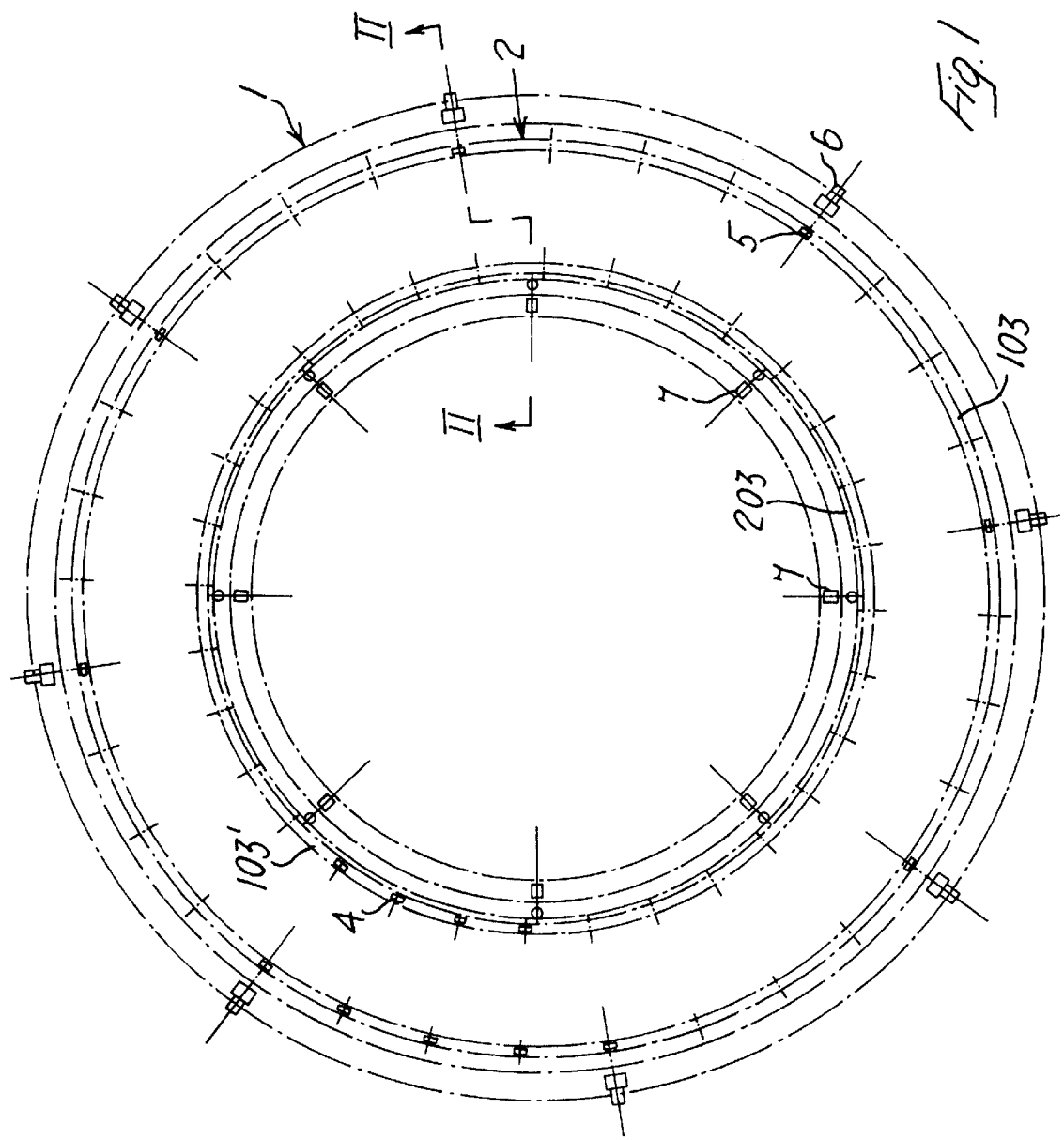

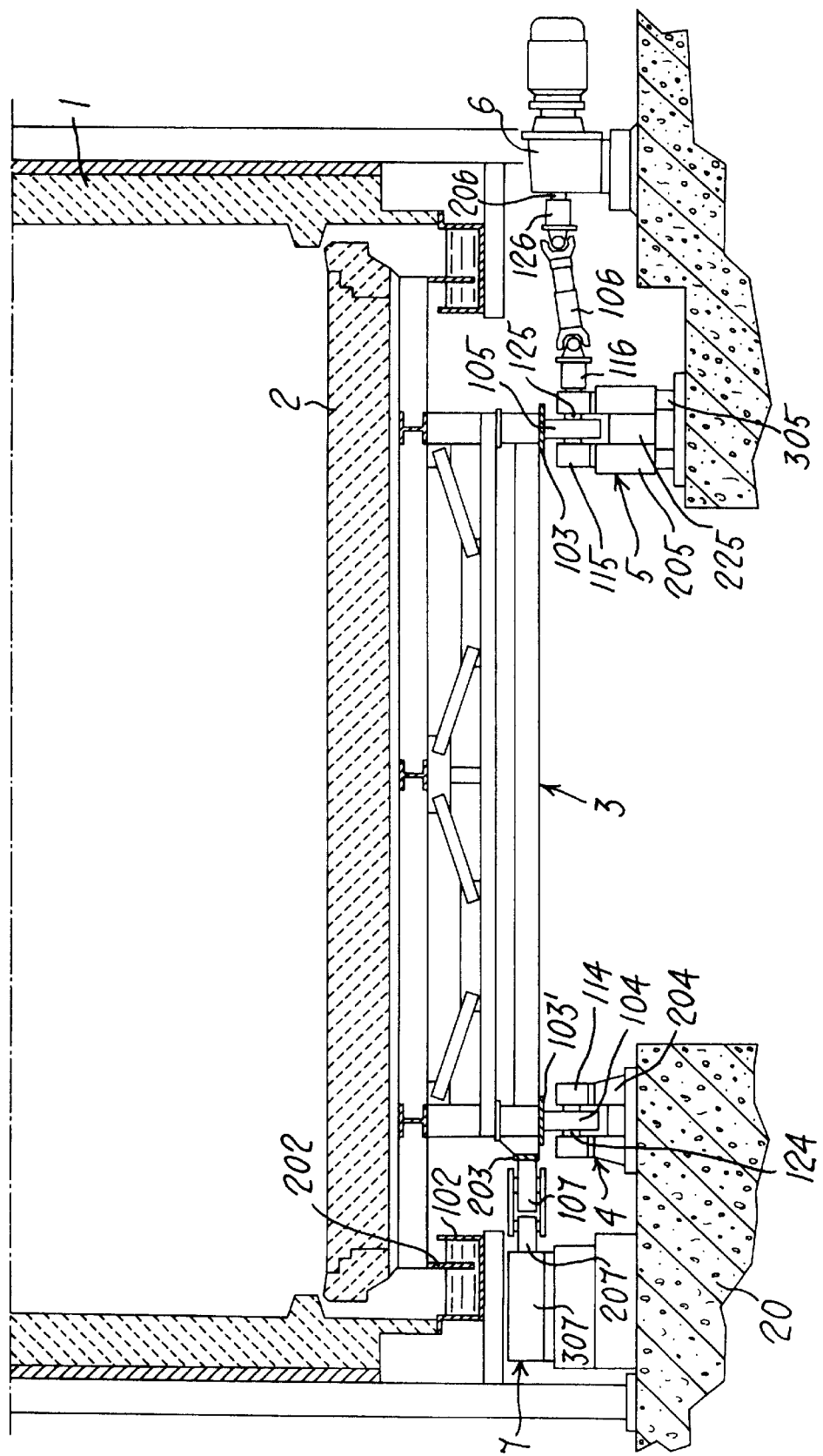

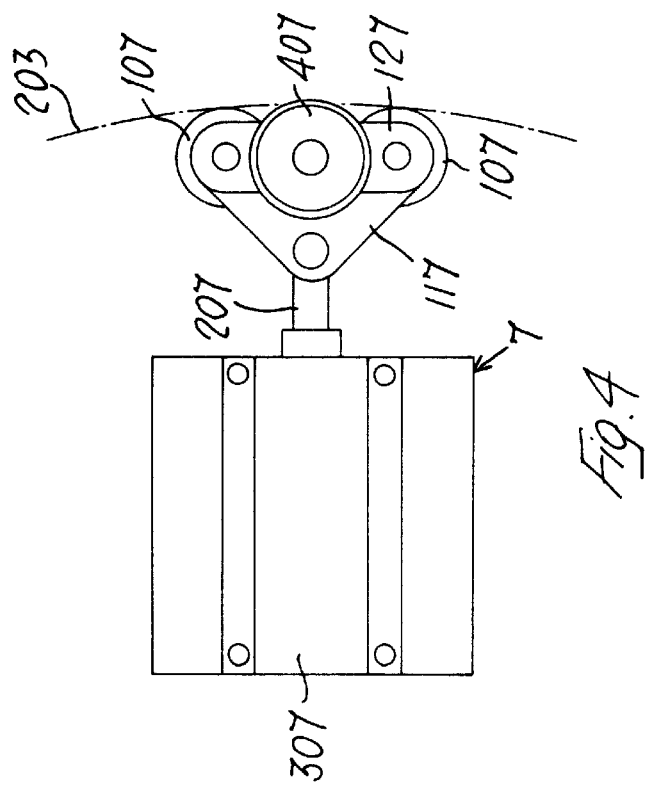
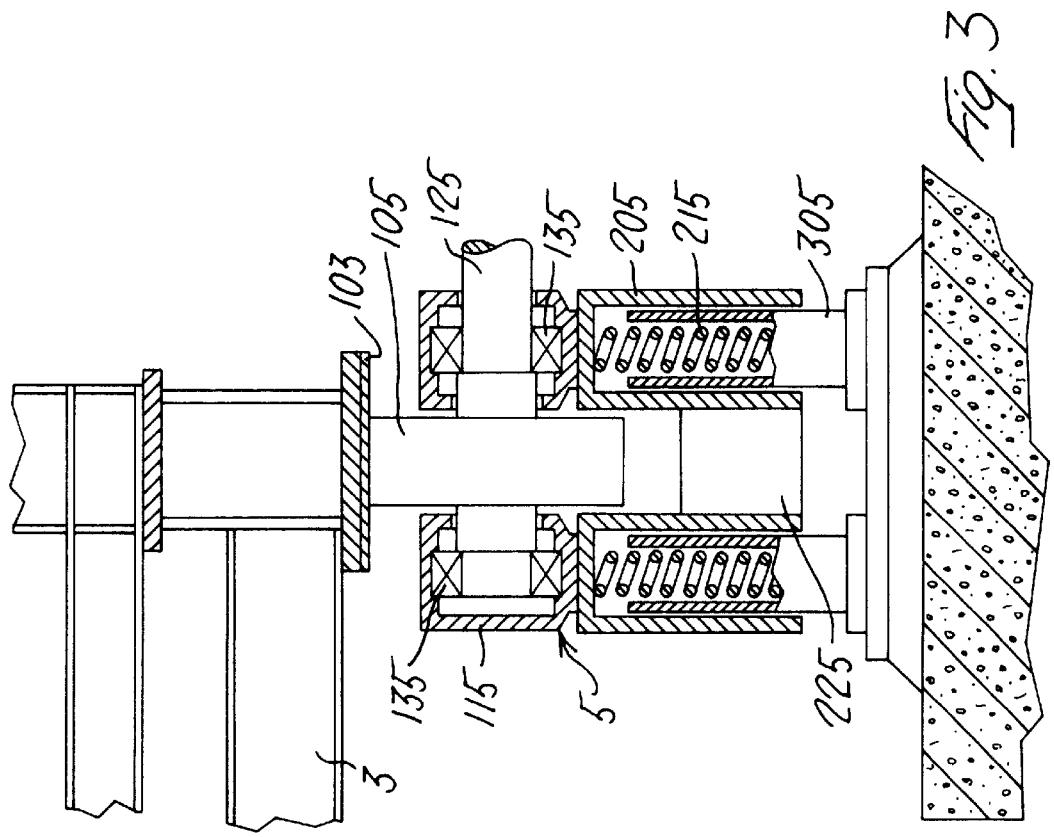

ROTARY HEARTH FURNACE

FIELD OF THE INVENTION

The present invention relates to ore treatment furnaces, and in particular relates to rotary-hearth furnaces.

BACKGROUND OF THE INVENTION

These furnaces generally comprise a toroidal chamber and rotary hearth which is driven by a ring gear on its perimeter, or rather on the perimeter of its supporting frame, meshing with one or more pinions. This kind of drive certainly gives precise control of the movement of the hearth, which in certain types of treatment may be necessary, but the manufacturing costs are extremely high. These costs have little justification where precise control of the movement of the hearth is not required because of the methods used to process the ore.

The hearth is, as has already been stated, mounted on a supporting frame that is provided with motion-support means, such as for example a plurality of wheels acting on a circular track arranged in a plane parallel to the plane of the hearth, and guide means, such as rollers acting on at least one cylindrical track arranged around the outer or inner perimeter of the hearth supporting frame; the rollers have means for providing a thrust in a radial direction with respect to the said track.

SUMMARY OF THE INVENTION

The object of the present invention is to provide a rotary-hearth furnace in which the hearth drive means are simple and relatively inexpensive to install, requiring no special structural alterations to the hearth and its supporting frame.

This object of the present invention is therefore a furnace for the treatment of ore on a rotary hearth, comprising a toroidal chamber, a rotary hearth and drive means for the said rotary hearth, the said hearth being arranged on a supporting frame fitted with guide means and motion-support means, characterized in that the drive means are at least partly connected to the said guide means and/or to the said motion-support means.

In one embodiment of the invention, the said motion-support means comprise a plurality of wheels acting on a circular track arranged in a plane parallel to the plane of the hearth of the furnace, the said drive means being connected to one or more of the said wheels.

In another alternative embodiment the guide means comprise rollers acting on at least one cylindrical track arranged on the outer or inner perimeter of the supporting frame of the hearth; the rollers are fitted with means for providing a thrust in a radial direction with respect to the said track, the drive means being connected to one or more of the said rollers.

BRIEF DESCRIPTION OF THE DRAWINGS

Other advantages and features will become clear in the following description of some embodiments of the present invention provided by way of nonrestrictive example with reference to the accompanying drawings, in which:

FIG. 1 is a schematic plan view of the furnace according to the present invention;

FIG. 2 is a sectional view on II—II as marked in FIG. 1;

FIG. 3 is a cross-section of a detail from FIG. 2; and

FIG. 4 is a plan view of a detail of an alternative embodiment of the present invention.

DETAILED DESCRIPTION OF SOME PREFERRED EMBODIMENTS OF THE INVENTION

FIG. 1 schematically illustrates the rotary-hearth furnace according to the present invention: having a taroidal chamber. The bottom wall of the said chamber is formed by the rotary-hearth 2 which is basically annular. This hearth is provided with two plane tracks, an outer track 103 and an inner track 103', acting on the wheels of motion-support assemblies 5 and 4, respectively. Some of the wheels 5 are connected to drive means, in this case the motor/gearbox assemblies 6. The innermost peripheral edge of the hearth 2 has a cylindrical track 203 acting on the guide means 7.

FIG. 2 shows a section through the furnace according to the present invention. As already stated, the bottom wall of the toroidal chamber 1 is formed by the rotary hearth 2 mounted on the supporting frame 3. On the underside of the hearth, on both its inner and outer perimeters, are flanges 202 inserted in the water tracks 102. On the face of the frame 3 furthest from the hearth 2 are two tracks, one near the centre and the other nearer the exterior, 103' and 103, respectively, which tracks act on the wheels of the motion-support assemblies 4 and 5. The motion-support assembly 4 comprises a fork 204 fixed to the floor 20, while at the ends of the arms of the fork 204 are two axle boxes 114 in which the hub 124 of the wheel 104 turns idly in contact with the track 103' of the supporting frame 3.

The motion-support assembly 5 comprises the fork 305 fixed to the floor 20 and on which the sleeves 205 slide, joined together by the portion 225. At the nearest point of the sleeves 205 to the frame 3 are the axle boxes 115 that carry the hub 125 of the wheel 105. This hub 125 is connected to the driven end 116 of a universal joint 106, the other end 126 of which is connected to the transmission shaft 206 of the motor/gearbox assembly 6.

On the inner perimeter of the frame 3 is a cylindrical track 203 whose axis is perpendicular to the plane of the hearth 2 and which is acted upon by the guide assembly 7. This guide assembly includes the roller 107 held in contact with the surface of the track 203 by the rod 207 of the ram 307.

FIG. 3 illustrates in section a detail of FIG. 2 regarding the motion-support assembly 5. As the figure shows, the forks 305 and the sleeves 205 are internally hollow and contain the elastic suspension means or springs 215. The axle boxes 115 also have bearings 135 to guide the hub 125.

Lastly, FIG. 4 shows an alternative embodiment of the invention relating to the guide assembly 7. In the figure the guide assembly comprises a pair of rollers 107 connected by the plate 117 to the rod 207 of the elastic loading means or ram 307. On the plate, moreover, is mounted the motor 407 to give the drive through the transmission 127 to the rollers 107.

The operation of the rotary-hearth furnace according to the present invention will be made clear below. The hearth 2, as can be seen in the figures described earlier, is rotary and is provided, in a manner known per se, with guide and motion-support means. These motion-support means generally comprise a plurality of wheels acting on at least two tracks fixed to the outer and inner circumferences defining the hearth, and integral with the supporting frame 3 of the said hearth. Given the great weight of the hearth and frame, contact between the track and the wheels includes a considerable component of friction. The present invention makes use of this friction by giving some of the wheels respective drive means connected to their hubs, as in the case exemplified in FIG. 2, the hub 125 of the wheel 105 being connected to the motor/gearbox assembly 6.

Naturally, in order to optimize the use of the friction for the rotary drive of the hearth, the motion-support assemblies 5 connected to drive means may be equipped with elastic suspension or damper means, as illustrated in FIG. 3, to allow a better distribution of the load and hence a more even transmission of the drive.

As a logical consequence, the transmission between the drive means is produced in such a way as to assist the movement of the motion-support assembly 5, i.e. via the universal joint 106.

An exactly similar result could be obtained by positioning the motion-support assemblies 4 and 5 on the supporting frame 3 of the hearth 2, with the track around which the assemblies 4 and 5 travel being fixed to the floor.

In an alternative embodiment illustrated in FIG. 4, some of the guide assemblies 7 include an electric motor 407 which drives the rollers 107 via the transmission 127. This embodiment further exploits a component of the guide and motion-support means of the hearth in order to turn it. By exploiting to a very small extent the friction due to the weight of the hearth, this type of drive will of course be efficient especially in combination with the drive system described above.

Constructed in this way, the furnace has a hearth that is rotated by means that are extremely simple to produce, that exploit the structure of the hearth itself and of its supporting frame in an economically significant manner, and that can be connected to drive means of moderate cost.

What we claim is:

1. Furnace for the treatment of ore on a rotary hearth, comprising: a toroidal chamber, a rotary hearth, and drive means for said rotary hearth, said hearth being arranged on a supporting frame fitted with guide means and motion-support means, and wherein (a) said drive means are at least partly connected to one of said guide means and said motion-support means, (b) said motion-support means comprise a plurality of wheels acting on at least two plane circular tracks arranged concentrically in a plane parallel to the plane of the hearth, at least one of said wheels being connected to said drive means, and (c) said tracks are fixed to said supporting frame and said wheels are arranged on a floor underneath of said supporting frame.

2. Furnace according to claim 1, in which said wheel connected to said drive means is provided with elastic suspension means.

3. Furnace according to claim 2, in which said drive means are connected to said wheel by transmission means that include a universal joint.

4. Furnace according to claim 1, in which said guide means comprise, on the inner or outer perimeter of the supporting frame, at least one cylindrical track acting on a plurality of rollers that are fitted with elastic loading means, one or more of said being connected to drive means.

* * * * *